United States Patent [19]

Silva

[11] Patent Number: 4,814,429

[45] Date of Patent: Mar. 21, 1989

[54] METHOD FOR PREPARING CYCLIC POLYCARBONATE OLIGOMERS

[75] Inventor: James M. Silva, Clifton Park, N.Y.

[73] Assignee: General Electric Company, Schenectady, N.Y.

[21] Appl. No.: 136,629

[22] Filed: Dec. 22, 1987

[51] Int. Cl.[4] .............................................. C08G 63/62
[52] U.S. Cl. ..................................... 528/371; 526/65; 528/196; 528/370
[58] Field of Search ....................... 528/371, 370, 196; 526/65

[56] References Cited

U.S. PATENT DOCUMENTS 4,616,077 10/1986 Silva .................................... 528/371
4,727,134 2/1988 Brunelle et al. .................... 528/371

Primary Examiner—Harold D. Anderson
Attorney, Agent, or Firm—William H. Pittman; James C. Davis, Jr.; James Magee, Jr.

[57] ABSTRACT

Cyclic polycarbonate oligomers are prepared by the reaction of a bisphenol bischloroformate (e.g. bisphenol A bischloroformate) with an amine (e.g., triethylamine) and an alkali or alkaline earth metal hydroxide in at least two back-mixed vessels and in a mixed aqueous-organic system. The liquid contents of each vessel except the last are passed to the next vessel and each vessel is simultaneously charged with reactants, with the concentration of carbonate units in the reactants being less in the first vessel than in subsequent vessels. By this method, there is obtained a cyclic product containing a minimum proportion of linear polycarbonates.

19 Claims, 1 Drawing Sheet

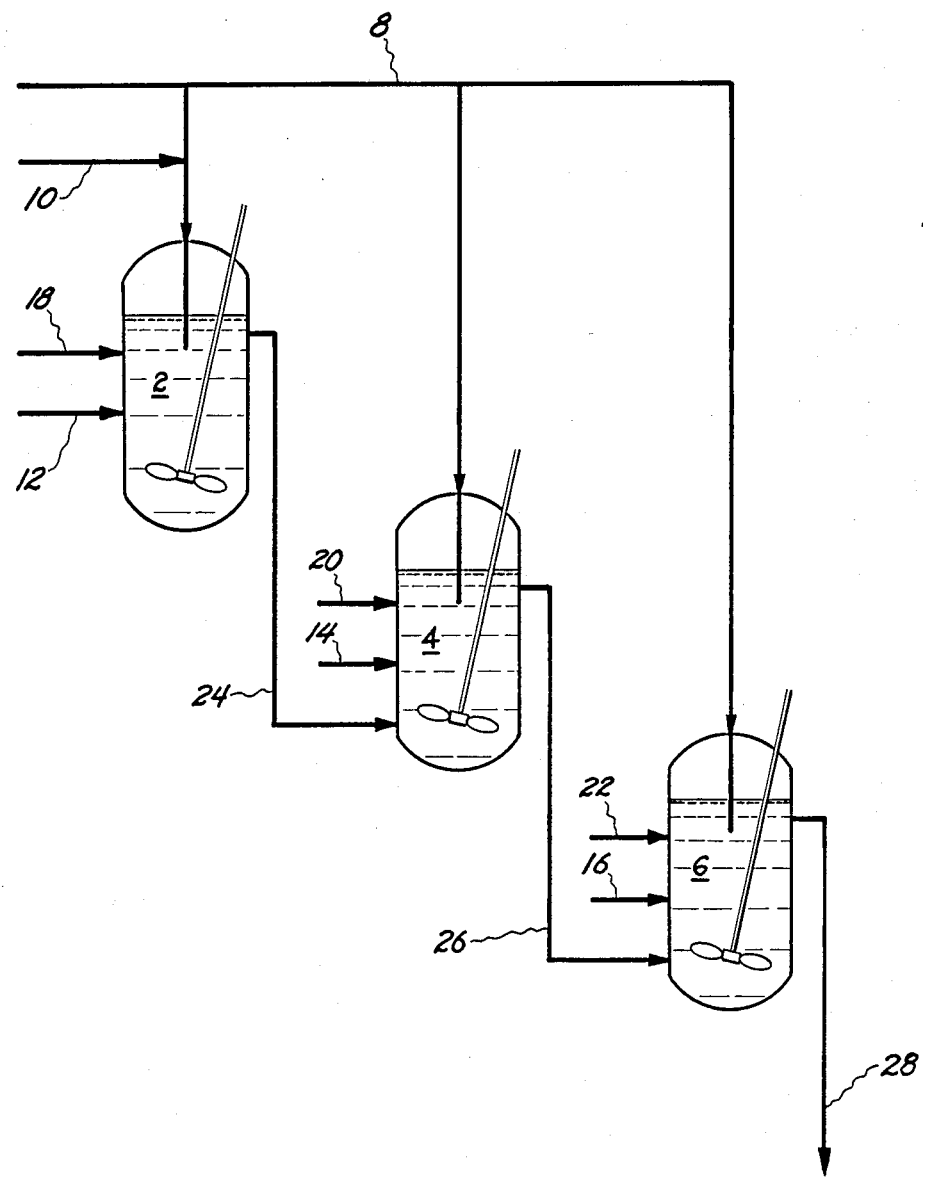

METHOD FOR PREPARING CYCLIC POLYCARBONATE OLIGOMERS

This invention relates to cyclic polycarbonate oligomers and methods for their preparation. More particularly, it relates to an improved method which is readily adaptable to continuous operation and which minimizes the formation of linear polycarbonates.

Cyclic aromatic polycarbonate oligomers convertible to linear polycarbonates, often of very high molecular weight, are known. Such oligomers may be pure compounds such as the trimer or tetramer, as disclosed, for example, in the following U.S. Pat. Nos.:

| | |
|---|---|
| 3,155,683 | 3,386,954 |
| 3,274,214 | 3,422,119. |

For many purposes, cyclic polycarbonate oligomer mixtures are preferred since they can be more easily handled and polymerized. The preparation of oligomer mixtures of this type is disclosed in U.S. Pat. No. 4,644,053, the disclosure of which is incorporated by reference herein. Preparation is typically by the reaction of a corresponding bischloroformate composition with an alkali metal hydroxide and a tertiary amine.

U.S. Pat. No. 4,616,077 discloses a method for the preparation of cyclic polycarbonate oligomers which is adaptable to continuous operation. In its preferred embodiment, said method involves the use of a continuous-flow stirred tank reactor (hereinafter sometimes "CSTR") with certain limitations on stirring rate.

It is sometimes found that the product prepared by the use of a single CSTR contains substantial proportions of linear polycarbonates (hereinafter sometimes denoted "linears") as by-products. Such linears must frequently be removed before the cyclic oligomers can be used. If large proportions of linears are obtained, the yield of cyclics decreases and the cost of producing them increases correspondingly.

The present invention is based in part on the discovery that the percentage of linears in the product is roughly proportional to reagent concentration in the reaction mixture. That is, the yield of cyclics can be increased by operating in more dilute solution. Those skilled in the art will realize, however, that operating in very dilute solution is disadvantageous for other reasons. Among these are the inconvenience of handling large amounts of diluents and the costs of removing said large amounts of diluents from the product prior to use.

The present invention produces cyclics in relatively high yield with a minimum of linears as by-products. It permits the isolation of cyclics in relatively concentrated form, minimizing the amount of diluent which must be removed during product isolation. Moreover, it is particularly adapted to continuous operation.

The invention is a method for preparing a composition comprising cyclic polycarbonate oligomers which comprises charging to at least two back-mixed vessels:

(A) a solution in (A-1) a substantially non-polar organic liquid which forms a two-phase system with water, of (A-2) a composition comprising bischloroformates of the formula

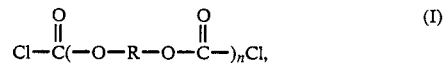

wherein R is a divalent aromatic radical and n is at most 4 in a major proportion of said bischloroformates;

(B) at least one aliphatic or heterocyclic tertiary amine which dissolves preferentially in the organic phase of the reaction mixture; and (C) an aqueous alkali or alkaline earth metal hydroxide solution or suspension;

reagent A being charged separately from reagents B and C, and the concentration in reagent A-1 of structural units of the formula

being less in the first of said vessels than in subsequent vessels;

effecting contact between reagents A, B and C in each vessel for a period of time and under conditions sufficient for the conversion of reagent A-2 to cyclic polycarbonate oligomers; thereafter passing the liquid contents of each vessel except the last to the next of said vessels; and recovering said oligomer composition from the last vessel.

Reagent A in the method of this invention is a solution of certain bischloroformates (reagent A-2) in a substantially non-polar organic liquid (reagent A-1) which forms a two-phase system with water. The identity of the liquid used as reagent A-1 is not critical, provided it possesses the stated properties. Illustrative liquids are aromatic hydrocarbons such as toluene and xylene; substituted aromatic hydrocarbons such as chlorobenzene, o-dichlorobenzene and nitrobenzene; and chlorinated aliphatic hydrocarbons such as chloroform and methylene chloride. Mixtures of the foregoing, as well as mixtures including ethers such as tetrahydrofuran, are also useful. Methylene chloride is preferred.

Reagent A-2 is a bischloroformate composition in which the R values are divalent aromatic radicals such as m-phenylene, p-phenylene, 4,4'-bisphenylene and 2,2-bis(4-phenylene)propane. Other suitable radicals are those which correspond to the dihydroxy compounds disclosed by name or formula (generic or specific) in U.S. Pat. No. 4,217,438, the disclosure of which is incorporated by reference herein. Also included are radicals containing non-hydrocarbon moieties. These may be substituents such as chloro, nitro, alkoxy and the like, and also linking radicals such as thio, sulfoxy, sulfone, ester, amide, ether and carbonyl. Most often, however, all R radicals are hydrocarbon radicals.

The R radicals preferably have the formula

wherein each of $A^1$ and $A^2$ is a monocyclic divalent aromatic radical and Y is a bridging radical in which one or two atoms separate $A^1$ from $A^2$. The free valence bonds in formula III are usually in the meta or para-positions of $A^1$ and $A^2$ in relation to Y. Such R values may be considered as being derived from bisphenols of the formula HO—$A^1$—Y—$A^2$—OH. Frequent reference to bisphenols will be made hereinafter, but it should be understood that R values derived from suitable compounds other than bisphenols may be employed as appropriate.

In formula III, the $A^1$ and $A^2$ values may be unsubstituted phenylene radicals or substituted derivatives thereof, illustrative substituents (one or more) being alkyl, alkenyl (e.g., crosslinkable-graftable moieties such as vinyl and allyl), halo (especially chloro and/or bromo), nitro, alkoxy and the like. Unsubstituted phenylene radicals are preferred. Both $A^1$ and $A^2$ are preferably p-phenylene, although both may be o- or m-phenylene or one o- or m-phenylene and the other p-phenylene.

The bridging radical, Y, is one in which one or two atoms, preferably one, separate $A^1$ from $A^2$. It is most often a hydrocarbon radical and particularly a saturated radical such as methylene, cyclohexylmethylene, 2-[2.2.1]-bicycloheptylmethylene, ethylene, isopropylidene, neopentylidene, cyclohexylidene, cyclopentadecylidene, cyclododecylidene or adamantylidene, especially a gem-alkylene radical. Also included, however, are unsaturated radicals and radicals which are entirely or partially composed of atoms other than carbon and hydrogen. Examples of such radicals are 2,2-dichloroethylidene, carbonyl, thio and sulfone. For reasons of availability and particular suitability for the purposes of this invention, the preferred radical of formula III is the 2,2-bis(4-phenylene)propane radical, which is derived from bisphenol A and in which Y is isopropylidene and $A^1$ and $A^2$ are each p-phenylene.

The bischloroformate composition may be monomeric bisphenol bischloroformate employed in substantially pure, isolated form, but is more often a crude bischloroformate product containing, for example, other compounds such as monochloroformates. Suitable crude products may be prepared by any known methods for bischloroformate preparation. Typically, at least one bisphenol is reacted with phosgene in the presence of a substantially inert organic liquid, as disclosed in the following U.S. Pat. Nos.:

| | |
|---|---|
| 3,255,230 | 3,966,785 |
| 3,312,661 | 3,974,126. |

The disclosures of these patents are incorporated by reference herein. In addition to monomer bischloroformate, such crude bischloroformate product may contain oligomer bischloroformates; preferably, a major proportion of said product consists of bischloroformates containing up to 4 structural (i.e., bisphenol) units. It may also contain minor amounts of higher oligomer bischloroformates and of monochloroformates corresponding to any of the aforementioned bischloroformates.

The preparation of the crude bischloroformate product preferably takes place in the presence of aqueous alkali. The pH of the reaction mixture may be up to about 14 and is preferably no higher than about 12. It is generally found, however, that the proportion of linears in the cyclic oligomer mixture is minimized by employing a crude bischloroformate product comprising a major amount of bisphenol bischloroformate and only minor amounts of any oligomer bischloroformates. Such products may be obtained by the method disclosed in U.S. Pat. No. 4,638,077, the disclosure of which is also incorporated by reference herein.

In that method, phosgene is passed into a mixture of a substantially inert organic liquid and a bisphenol, said mixture being maintained at a temperature within the range of about 10°-40° C., the phosgene flow rate being at least 0.15 equivalent per equivalent of bisphenol per minute when the temperature is above 30° C. (For this purpose, the equivalent weight of a bisphenol is half its molecular weight and that of phosgene is equal to its molecular weight.) An aqueous alkali metal or alkaline earth metal base solution is simultaneously introduced as necessary to maintain the pH in the range of 0-8. By this method, it is possible to prepare bischloroformate in high yield while using a relatively small proportion of phosgene, typically up to about 1.1 equivalent per equivalent of bisphenol.

When one of these methods is employed, it is obvious that the crude bischloroformate product will ordinarily be obtained as a solution in a substantially non-polar organic liquid such as those disclosed hereinabove. Depending on the method of preparation, it may be desirable to wash said solution with a dilute aqueous acidic solution to remove traces of base used in preparation.

The tertiary amines useful as reagent B ("tertiary" in this context denoting the absence of N—H bonds) generally comprise those which are oleophilic (i.e., which are soluble in and highly active in organic media, especially those used in the method of this invention), and more particularly those which are useful for the formation of polycarbonates. Reference is made, for example, to the tertiary amines disclosed in the aforementioned U.S. Pat. No. 4,217,438 and in U.S. Pat. No. 4,368,315, the disclosure of which is also incorporated by reference herein. They include aliphatic amines such as triethylamine, tri-n-propylamine, diethyl-n-propylamine and tri-n-butylamine and highly nucleophilic heterocyclic amines such as 4-dimethylaminopyridine (which, for the purposes of this invention, contains only one active amine group). The preferred amines are those which dissolve preferentially in the organic phase of the reaction system; that is, for which the organic-aqueous partition coefficient is greater than 1. This is true because intimate contact between the amine and reagent A is essential for the formation of the cyclic oligomer mixture. For the most part, such amines contain at least about 6 and preferably about 6–14 carbon atoms.

The amines most useful as reagent B are trialkylamines containing no branching on the carbon atoms in the 1- and 2- positions. Especially preferred are tri-n-alkylamines in which the alkyl groups contain up to about 4 carbon atoms. Triethylamine is most preferred by reason of its particular availability, low cost, and effectiveness in the preparation of products containing low percentages of linear oligomers and high polymers.

Reagent C is an aqueous alkali or alkaline earth metal hydroxide solution or suspension. It is most often a lithium, sodium or potassium hydroxide solution, with sodium hydroxide being preferred because of its availability and relatively low cost. The concentration of said solution is usually about 0.2–12 N.

According to the invention, reagents A, B and C are charged to at least two back-mixed vessels. Illustrative of such vessels are tank reactors and certain types of loop reactors. Particularly preferred for purposes of the present invention are CSTR's, which are known to be back-mixed reactors; reference if made to Perry, *Chemical Engineers Handbook*, Fourth Edition, p. 19-11 (FIG. 19-22), and Levenspiel, *Chemical Reaction Engineering*, Second Edition, p. 98 (FIG. 1c). It should be understood, however, that other back-mixed reactors may be substituted therefor when appropriate.

More than two vessels may be employed. However, there is seldom any perceivable advantage in employing more than three. Therefore, the use of two or three vessels is preferred.

To avoid premature reaction, it is necessary to charge reagent A separately from reagents B and C. Reagent B may be charged as a solution in reagent A-1 if desired. Reagents B and C may be charged separately or in combination.

The concentration in reagent A-1 of structural units of formula II, either as part of reagent A-2 or as part of the cyclic polycarbonate product, is less in the first vessel than in subsequent vessels. This may be achieved by introducing additional reagent A-1 into said first vessel, either separately or by further diluting reagent A-2 upstream of said vessel.

The purpose of introducing further reagent A-1 at this stage is based on the above-explained discovery that the yield of cyclics is increased by operating in more dilute solutions. Preferably, up to about 0.6 mole and especially about 0.2–0.5 mole of structural units of formula II is present per liter of reagent A-1 in at least one vessel, most often the first. It is within the scope of the invention for the corresponding concentration in the second vessel to be less than that in any third vessel.

The conditions in each vessel are maintained so as to insure agitation (preferably by stirring) of the reaction mixture. Preferably, the rate of agitation is just sufficient to prevent segregation of the aqueous and organic liquid phases. Less effective agitation conditions decrease the yield of cyclic oligomer as a result of incomplete contact between the reagents.

On the other hand, agitation which is too rapid causes an increase in linears at the expense of cyclics. It is believed that formation of linear polycarbonates occurs interfacially, in similar manner to conventional polycarbonate production. Therefore, minimization of interfacial area is normally accompanied by an increase in the proportion of cyclics in the product. Moreover, when reagent A-1 is denser than water, as is true of methylene chloride and most other halogenated hydrocarbons, if the stirring rate is too rapid a liquid-liquid centrifuge effect may cause premature discharge of a portion of the organic phase. Such premature discharge can be avoided by decreasing the stirring rate of the reaction mixture.

It will be apparent to those skilled in the art that a number of parameters can affect the conditions of agitation. Among these are the design and location of charging means for the reagents; the design, location and speed of operation of agitating means; and the presence or absence and design of agitation facilitating means such as baffles in the reactor. It is generally preferred to introduce all reagents under the surface of the reaction mixture in the tank reactor. Other parameters can readily be adjusted by those skilled in the art with minimum experimentation so as to provide the preferred agitation conditions.

The reaction between the above-described reagents is allowed to proceed in each vessel for a period of time sufficient to produce the desired cyclic polycarbonate oligomers. The residence time in each vessel is usually in the range of about 6–30 minutes, especially about 8–16 and preferably about 8–12 minutes. It has been found that reaction is often essentially complete irrespective of residence time. However, at shorter residence times the amount of linears in the product sharply increases, while at residence times greater than about 20 minutes, hydrolysis of the bischloroformate and/or cyclic oligomer product by the aqueous phase may occur, also leading to an increase in formation of linears.

Reaction temperature, considered in isolation, is not a crucial factor in the invention. There is seldom an advantage in operating below about 20° C., since the reaction rate may then be undesirably low. When the reaction is conducted at or near atmospheric pressure, temperatures above 100° C. are seldom warranted, in part because of the high energy input required. Under most circumstances, a temperature no higher than about 50° C. is appropriate. It is within the scope of the invention, but seldom advantageous, to operate above or below atmospheric pressure. However, higher temperatures may be employed if the method is conducted at elevated pressures.

In two respects, the temperature effect may be material. The first is the increasing disorder in the system as the temperature approaches reflux and then increases to increase the intensity of reflux. Such an increase in disorder should generally be accompanied by a decrease in externally provided agitation, so as to maintain the previously described conditions of agitation.

The second consideration is the effect of temperature on residence time. For example, the boiling point of methylene chloride is about 40° C. As that temperature is approached closely, there is a sharp increase in the volume of vapor in the system. Much vapor is present as bubbles in the liquid phase, decreasing the liquid volume in the reaction vessel.

When a CSTR is employed, the residence time decreases in inverse proportion to the volume of vapor contained as bubbles in the liquid phase. This is one factor in the importance of reaction temperature, especially when a low boiling solvent such as methylene chloride is employed.

Balancing these factors, it is frequently found advantageous to operate at a reaction temperature from about 20° C. to at least 1° C. below the reflux temperature. When the solvent is methylene chloride, temperatures in the range of about 2514 20 C. are often convenient.

Another factor of some importance when a low boiling solvent is used is the avoidance of solvent loss by volatilization. Solvent loss, with a resulting decrease in the volume of the organic phase, can cause reproducibility problems if inefficient condensing means are utilized. It may be advisable under these circumstances to employ cooling temperatures as low as −70° C. to −75° C. in one or more condensers. It may also be advisable to provide a liquid seal on the CSTR outlet port, which may be formed by means of an inverted U-shaped or right angle bend.

Other factors affecting the proportion of linears in the product include the proportion of reagent B and, to some extent, reagent C to reagent A-2. For the sake of convenience, these proportions are expressed herein as ratios of moles of the corresponding reagent to moles of structural units in reagent A-2. For reagents B and C, this ratio is hereinafter designated the "structural molar ratio" of the appropriate reagent.

Under most circumstances, the structural molar ratio of reagent B should be in the range of about 0.05–1.0:1 and preferably about 0.15–0.4:1K). The concentration of reagent B is most often in the range of about 0.03–0.50 and preferably about 0.05–0.20 mole per liter of organic phase (i.e., all constituents except those in aqueous solution) in the reaction mixture.

For the most part, other reaction conditions do not have as pronounced an effect on the composition of product as do the degree of agitation and residence time. However, it is generally found desirable to maintain a structural molar ratio of reagent C in the range of about 1.4–3.5:1 and preferably about 1.9–3.0:1. The volume ratio of aqueous to organic phase is ordinarily in the range of about 0.1–3.0:1.

An essential feature of the invention is the manner in which the reagents and mixtures resulting therefrom are introduced into the vessels and passed from one vessel to another. As described hereinabove, the reagents are fed into each of the vessels in parallel. It is also essential to pass the liquid contents of each vessel except the last to the next of said vessels. Thus, each vessel after the first receives charges of the individual reagents and also a charge of the product from the preceding vessel. By this means, the concentration of the product increases from each vessel to the next, permitting recovery of the oligomer composition from the last vessel at a suitably high concentration.

It will be apparent that in a preferred embodiment of the invention, the vessels are of increasing size as the contents proceed downstream. If they are not of increasing size, suitable holding vessels may be employed.

Reference is now made to the drawing which illustrates a system in which the method of this invention may be conducted. The system includes three CSTR's designated 2, 4 and 6, which are not drawn to scale. Each CSTR is charged with a solution of reagent A-2 in reagent A-1 through line 8. In addition, further reagent A-1 is furnished to CSTR 2 through line 10. Reagent B enters CSTR's 2, 4 and 6 at 12, 14 and 16, respectively, and reagent C similarly at 18, 20 and 22, respectively.

The feed rate of each reagent is regulated so as to provide the desired residence time, preferably about 8-12 minutes, in each CSTR. Solutions exit CSTR's 2 and 4 through lines 24 and 26, respectively, in each case passing to the next CSTR. If desired, additional reagent A-1 may be introduced into CSTR 4 through a further line (not shown). Product solution exits CSTR 6 through line 28 for recovery of cyclic polycarbonate oligomers, typically involving such conventional operations as precipitation of linears and/or vacuum stripping of reagent A-1.

As an illustration of how the method of this invention may be employed for the preparation of cyclic polycarbonate oligomers, consideration is now given to a system consisting of two CSTR's in series, with parallel feeds of bisphenol A bischloroformate solution. The CSTR's have effective volumes of 1.5 liters and 2 liters, respectively. The first CSTR is charged with 0.5 liter of a bisphenol A bischloroformate solution in methylene chloride, in which the concentration of bisphenol A carbonate units is 1 $\underline{M}$, and 1 liter of methylene chloride, together with appropriate proportions of triethylamine and aqueous sodium hydroxide solution. Thus, the contents of the first CSTR include 1.5 liters of a solution which is 0.33$\underline{M}$ in bisphenol A carbonate units.

The liquid mixture from the first CSTR passes to the second, which is also charged with the remaining 0.5 liter of 1 $\underline{M}$ bisphenol A bischloroformate. Thus, the second CSTR contains 2 liters of a solution 0.5 $\underline{M}$ in bisphenol A carbonate units. This more concentrated product solution is withdrawn from the second CSTR and the desired cyclic polycarbonates are isolated therefrom.

By reason of the convenient employment of CSTR's in the method of this invention, it will be apparent that said method is particularly adapted to continuous operation.

The following examples provide data relating to the invention in the form of simulated runs.

EXAMPLES 1-3

Three CSTR's with overflow tubes at a level to provide a liquid volume of 80 ml. were each charged with 0.96 ml. (7.04 mmol.) of triethylamine, 16 ml. of water and a volume of 9.214 $\underline{M}$ aqueous sodium hydroxide solution to provide 94.5 mmol. of sodium hydroxide, and filled with methylene chloride. The stirrer was then run at 275 rpm. as there were simultaneously added under the surface of the mixture, at 35° C., various bisphenol A bischloroformate oligomer solutions in methylene chloride, triethylamine and various aqueous sodium hydroxide solutions. The proportions and concentrations of the solutions were adjusted to provide 2.5 moles of sodium hydroxide per mole of bisphenol A carbonate structural units, 0.015 ml. (0.11 mmol.) of triethylamine per milliliter of methylene chloride, 0.25 ml. of aqueous phase per milliliter of organic phase, and a residence time in each reactor of 10 minutes. The methylene chloride was removed from the product solution by vacuum evaporation and the residue was analyzed by high pressure liquid chromatography to determine linears content.

The results of analysis are given in the following table.

| Example | Bisphenol A carbonate conc., moles/l. $CH_2Cl_2$ | Linears, % |
|---------|---------------------------------------------------|------------|
| 1       | 0.25                                              | 11.8       |
| 2       | 0.5                                               | 17         |
| 3       | 0.65                                              | 52         |

These results clearly show the increase in proportion of linears with an increase in concentration of bisphenol A carbonate structural units in the mixture. Since the product of any of Examples 1-3 would be stable under further reaction conditions in subsequent CSTR's, it can be seen that the proportion of linears in the cyclic polycarbonate product will decrease when multiple CSTR's are employed according to the present invention, as compared to the use of a single CSTR at the concentration of carbonate units desired in the final product solution.

What is claimed is:

1. A method for preparing a composition comprising cyclic polycarbonate oligomers which comprises charging to at least two back-mixed vessels:
   (A) a solution in (A-1) a substantially non-polar organic liquid which forms a two-phase system with water, of (A-2) a composition comprising bischloroformates of the formula

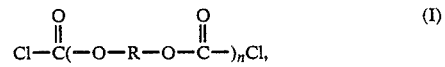

wherein R is a divalent aromatic radical and n is at most 4 in a major proportion of said bischloroformates;

(B) at least one aliphatic or heterocylic tertiary amine which dissolves preferentially in the organic phase of the reaction mixture; and (C) an aqueous alkali or alkaline earth metal hydroxide solution or suspension;

(A) being charged separately from (B) and (C), and the concentration in (A-1) of structural units of the formula $$-O-R-O-\overset{O}{\underset{\|}{C}}- \qquad (II)$$

being less in the first of said vessels than in subsequent vessels;

effecting contact between (A), (B) and (C) in each vessel for a period of time and under conditions sufficient for the conversion of (A-2) to cyclic polycarbonate oligomers; thereafter passing the liquid contents of each vessel except the last to the next of said vessels; and recovering said oligomer composition from the last vessel.

2. A method according to claim 1 wherein R has the formula $$-A^1-Y-A^2-, \qquad (III)$$

wherein each of $A^1$ and $A^2$ is a monocyclic divalent aromatic radical and Y is a bridging radical in which one or two atoms separate $A^1$ from $A^2$.

3. A method according to claim 2 wherein (C) is an alkali metal hydroxide solution.

4. A method according to claim 3 wherein a reaction temperature in the range of about 20°–50° C. in employed.

5. A method according to claim 4 wherein the mixture is added at a rate just sufficient to prevent segregation of the aqueous and organic liquid phases.

6. A method according to claim 5 wherein (A), (B) and (C) are introduced under the surface of the reaction mixture.

7. A method according to claim 6 wherein two or three back-mixed vessels are employed.

8. A method according to claim 7 wherein the vessels are continuous-flow stirred tank reactors.

9. A method according to claim 8 wherein (B) is triethylamine.

10. A method according to claim 9 wherein (C) is a sodium hydroxide solution.

11. A method according to claim 10 wherein (A-1) is methylene chloride.

12. A method according to claim 11 wherein a reaction temperature in the range of about 25°–39° C. is employed.

13. A method according to claim 12 wherein each of $A^1$ and $A^2$ is p-phebylene and Y is isopropylene.

14. A method according to claim 13 wherein reagent A-2 is a crude bischloroformate product comprising a major proportion of bischloroformates containing up to 4 structural units.

15. A method according to claim 14 wherein a residence time in each vessel in the range of about 8–16 minutes is employed.

16. A method according to claim 15 wherein a molar ratio of (B) to structural units of formula II in A-2 in the range of about 0.15–4.1 is employed.

17. A method according to claim 16 wherein the concentration of (B) is in the range of about 0.05–0.20 mole per liter of total (A-1).

18. A method according to claim 17 wherein a ratio of equivalents of (C) to structural units of formula II in (A-2) in the range of about 1.9–3.0:1 is employed.

19. A method according to claim 18 wherein a volume ratio of aqueous to organic phase in the range of about 0.1–3.0:1 is employed.

* * * * *